(12) United States Patent
Consul et al.

(10) Patent No.: US 8,515,974 B2
(45) Date of Patent: *Aug. 20, 2013

(54) USING MESSAGE SAMPLING TO DETERMINE THE MOST FREQUENT WORDS IN A USER MAILBOX

(75) Inventors: Ashish Consul, Redmond, WA (US); Suryanarayana M. Gorti, Redmond, WA (US); Michael Geoffrey Andrew Wilson, Sammamish, WA (US); James C. Kleewein, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/224,434

(22) Filed: Sep. 2, 2011

(65) Prior Publication Data

US 2011/0320467 A1  Dec. 29, 2011

Related U.S. Application Data

(63) Continuation of application No. 12/332,161, filed on Dec. 10, 2008, now Pat. No. 8,032,537.

(51) Int. Cl.
*G06F 17/30* (2006.01)
(52) U.S. Cl.
USPC ............ 707/750; 707/613; 704/246; 704/251
(58) Field of Classification Search
USPC .................... 707/613, 750; 704/246, 251
See application file for complete search history.

(56) References Cited

U.S. PATENT DOCUMENTS

| | | | |
|---|---|---|---|
| 6,198,808 B1 | 3/2001 | Martin | 379/88.14 |
| 6,526,382 B1 | 2/2003 | Yuschik | 704/275 |
| 6,760,694 B2 | 7/2004 | Al-Kazily et al. | 704/2 |
| 8,082,510 B2 * | 12/2011 | Patel et al. | 715/752 |
| 2004/0044950 A1 * | 3/2004 | Mills et al. | 715/500 |
| 2004/0098263 A1 * | 5/2004 | Hwang et al. | 704/266 |
| 2004/0153312 A1 * | 8/2004 | Yamamoto | 704/10 |
| 2006/0206569 A1 | 9/2006 | Heidloff et al. | 709/206 |
| 2007/0153989 A1 | 7/2007 | Howell et al. | 379/88.14 |
| 2007/0294239 A1 * | 12/2007 | Vuong | 707/5 |
| 2008/0198981 A1 | 8/2008 | Skakkebaek et al. | 379/88.13 |
| 2009/0319483 A1 | 12/2009 | Consul et al. | 707/3 |
| 2010/0142684 A1 | 6/2010 | Chang et al. | 379/88.14 |
| 2010/0217591 A1 | 8/2010 | Shpigel | 705/235 |

OTHER PUBLICATIONS

Cecchini et al; Securing Electronic Mail on the National Research and Academic Network of Italy http://www.usenix.org/event/lisa06/tech/full_papers/cecchini/cecchini.pdf; 2006; 14 pages.

Cohen; Learning Rules that Classify E-Mail;www2.parc.com/ist1/projects/mlia/papers/cohen.ps; 8 pages. 1996.

Payne; Learning Email Filtering Rules with Magi a Mail Agent Interface; http://eprints.ecs.soton.ac.uk/7789/1/msc_thesis.pdf; 1994; 72 pages.

Whittaker et al; Jotmail: A Voicemail Interface that Enables You to See What Was Said http://dis.shef.ac.uk/stevewhittaker/chi2000_voicemal_final.pdf; 8 pages. 2000.

Woitaszek et al.; Identifying Junk Electronic Mail in Microsoft Outlook with a Support Vector Machine, http://ieeexplore.ieee.org/ie15/8426/26546/01183045.pdf?isnumber=26546&prod=CNF&arnumber=1183045&arSt=+166&ared=+169&arAuthor=Woitaszek%2C+M.%3B+Shaaban%2C+M.%3B+Czernikowski%2C+R ; 2003; 4 pages. 2003.

* cited by examiner

Primary Examiner — Khanh Pham
(74) Attorney, Agent, or Firm — Merchant & Gould

(57) ABSTRACT

A method is presented for generating a list of frequently used words for an email application on a server computer. When a request is received for a word frequency list for emails stored in a user's mailbox, a word frequency list is returned if one exists. If the word frequency list does not exist, an asynchronous process is started on the server computer to generate a word frequency list. If the word frequency list exists but it is older than an aging limit, an asynchronous process is started on the server computer to regenerate the word frequency list. The word frequency list is stored in the user's mailbox along with a timestamp indicating the date and time that the list was created or updated.

19 Claims, 6 Drawing Sheets

USING MESSAGE SAMPLING TO DETERMINE THE MOST FREQUENT WORDS IN A USER MAILBOX

CROSS-REFERENCE TO RELATED APPLICATION

This application is a continuation of a U.S. application Ser. No. 12/332,161 filed on Dec. 10, 2008, entitled Using Message Sampling to Determine the Most Frequent Words in a User Mailbox.

BACKGROUND

Knowledge of the most frequent words in a user's personal data, including email, is very useful because it can help predict user behavior. This knowledge can be useful, for example, in creating an advertising strategy for the user or in an application that automatically organizes the user's information.

Modern email systems have the capability of receiving voice mail messages and transcribing the voice mail messages into text messages that can be stored in a user's mailbox. Knowledge of the most frequently used words in a user's mailbox can also be used as an aid to machine-based recognition software to more accurately transcribe voice mail messages into text messages.

SUMMARY

Embodiments of the invention are directed to generating a list of frequently used words for an email application on a server computer. A request is received on the server computer to provide a list of frequently used words in email messages stored in a user's mailbox on the server computer. If a word frequency list already exists on the server computer, the word frequency list is returned. If a word frequency list does not exist, an asynchronous process is started on the server computer to generate a word frequency list. If a word frequency list does exist but the age of the word frequency list is greater than an aging limit, the same asynchronous process is started on the server computer to regenerate the word frequency list. The word frequency list is stored in the user's mailbox and a timestamp, indicating the date and time when the word frequency list was created or updated, is stored in the user's mailbox.

The details of one or more techniques are set forth in the accompanying drawings and the description below. Other features, objects, and advantages of these techniques will be apparent from the description, drawings, and claims.

DETAILED DESCRIPTION

The present application is directed to systems and methods for determining the most frequently used words in a user's mailbox. A random sample of email messages in a user's mailbox is parsed, unique words are identified in each email message, and a count of the number of email messages containing each unique word is tabulated and stored. The messages are sampled using a technique of distributed random sampling, by which one or more server memory blocks are obtained at random, the contents are read into a buffer and a predetermined number of emails messages are parsed from one server memory block before another server memory block is obtained. The use of distributed random sampling improves the efficiency of reading and parsing email messages stored in server computer memory.

Figure 1:
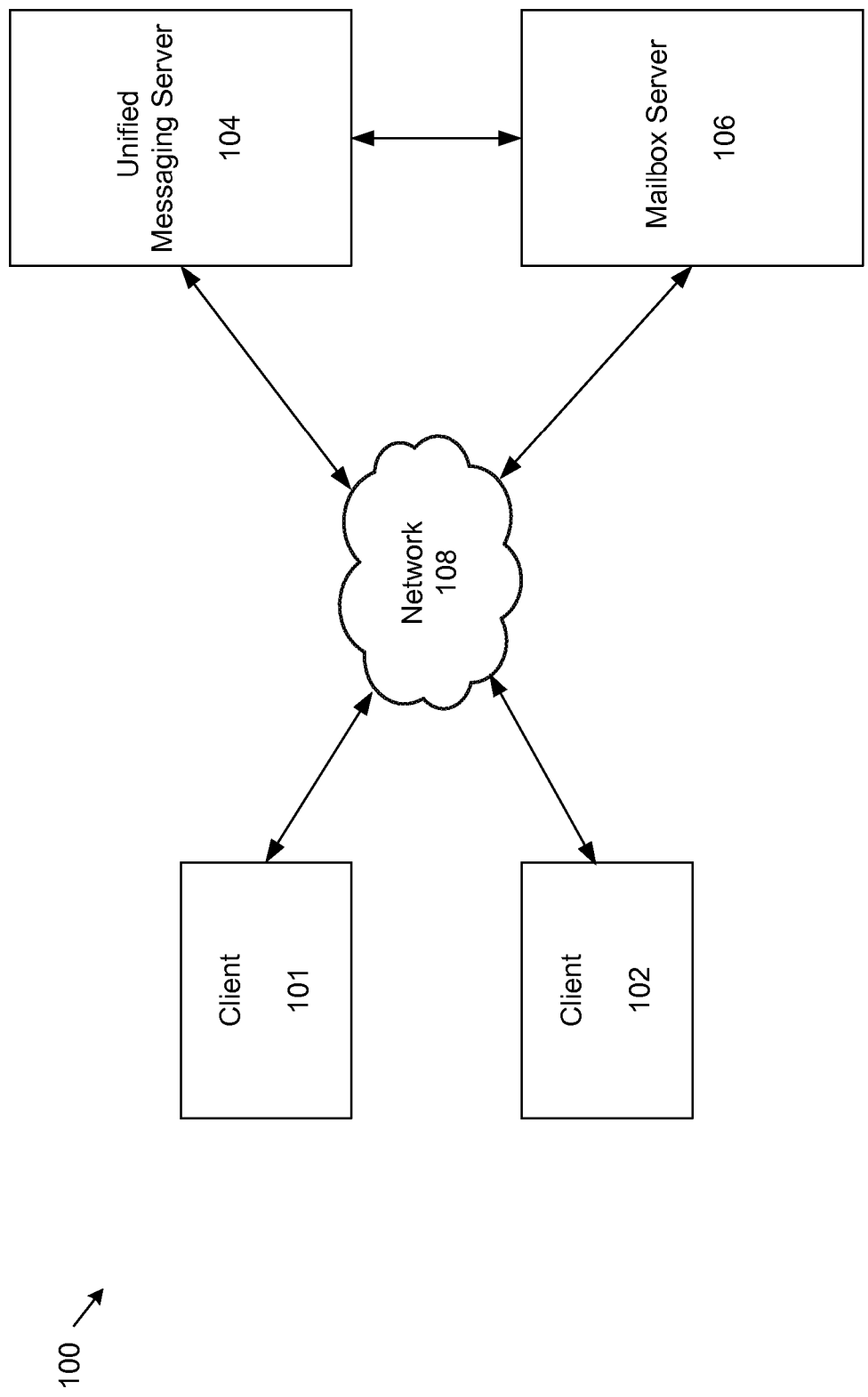
FIG. 1 shows an example system for determining the most frequently used words in a user's mailbox.

FIG. 1 shows an example system 100 that can be used to determine the most frequently used words in a user mailbox. This example system 100 is typically used in conjunction with computer generated text transcription of voice mail messages. The example system 100 includes two client computers 101 and 102, a unified messaging server 104, a mailbox server 106 and a network 108.

The example client computers 101 and 102 run a client-based email application, such as Microsoft Outlook from Microsoft Corporation of Redmond, Wash. The example unified messaging server 104, combines voice messaging and email into one mailbox. An example unified messaging server is the Unified Messaging Server that is part of Microsoft Exchange 2007 from Microsoft Corporation of Redmond, Wash. The example mailbox server 106 includes a plurality of databases, each of which includes a plurality of mailboxes. An example mailbox server is the Mailbox Server that is part of Microsoft Exchange Server 2007 from Microsoft Corporation of Redmond, Wash.

Client computers 101 and 102 communicate with the example unified exchange server 104 and with the example mailbox server 106 over wide-area network 108. The example unified exchange server 104 and example mailbox server 106 are typically located on the same physical site and may communicate with each other over a local area network. In some embodiments, the example unified exchange server 104 and example mailbox server 106 are located on the same physical server computer.

Figure 2:
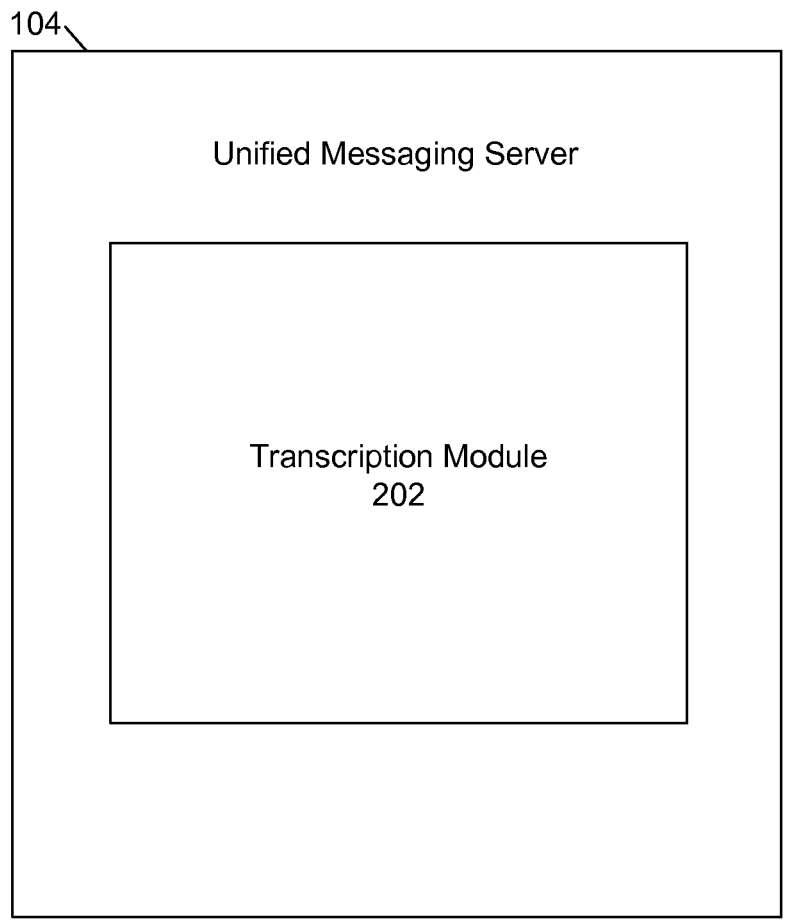
FIG. 2 shows modules of an example unified messaging server.

FIG. 2 shows that the example unified messaging server 104 includes an example transcription module 202. The example transcription module 202 transcribes received voice mail messages into text messages. The example transcription module 202 includes software that automates the voice to text transcription process, often making best guesses for words that sound alike. For example, it may be difficult for the transcription module software to distinguish between similar sounding names such as Perry and Terry. When used in conjunction with a word frequency list, if Perry has a much higher frequency of occurrence in a user's mailbox than Terry, the example transcription module 202 can use this information to make a more accurate translation.

In other embodiments, there may be additional applications for a word frequency list. In one example, a word frequency list may be used as an aid in directing online advertising to a user. For example, if a user has a high occurrence of the words Nautica and Polo, advertising may be directed to the user's mailbox for those products. Other uses for word frequency lists are possible.

Figure 3:
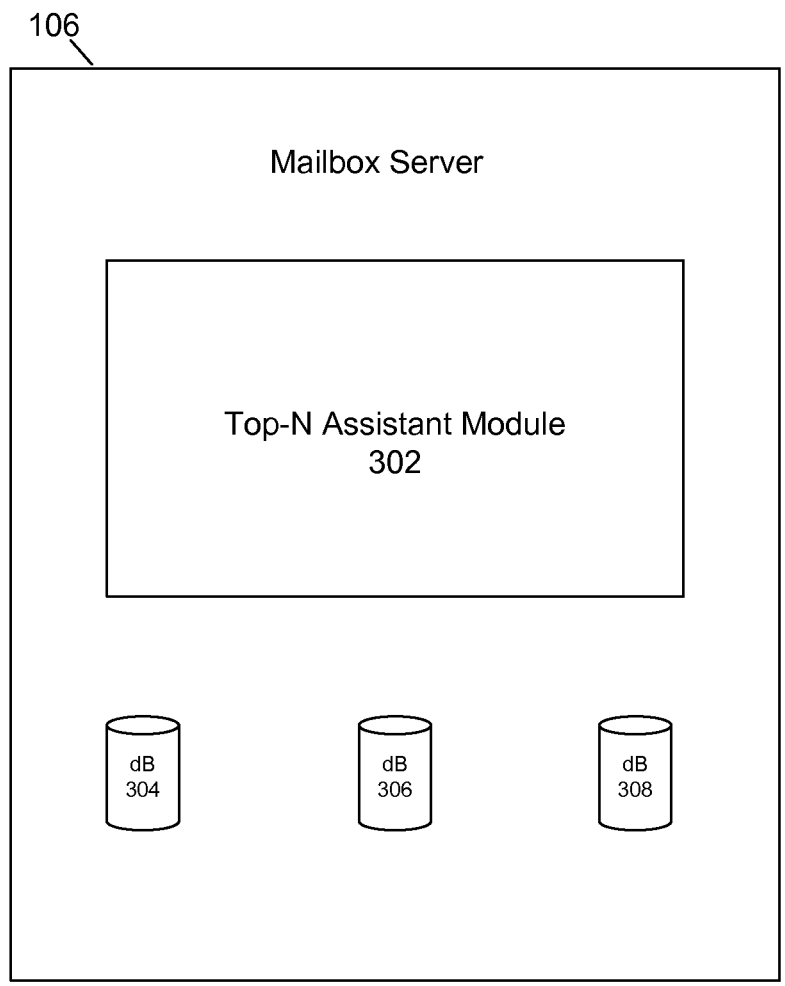
FIG. 3 shows modules of an example mailbox server.

FIG. 3 shows that the example mailbox server 106 includes example top-N assistant module 302 and example databases 304, 306 and 308. Typically mailbox servers include more than three databases. Each database typically includes hundreds or thousands of mailboxes. A unique word frequency list is stored for each mailbox.

The example top-N assistant module 302, determines if a word frequency list exists in a user's mailbox, returns the list to a calling process if the list exists and marks the user's mailbox for list generation if the list doesn't exist. Thus, the top-N assistant module 302 determines the most frequently used words, i.e. the top-N words.

Each word frequency list has a timestamp associated with it, indicating when the list was created or last generated. An aging parameter, configurable by an administrator, determines whether the list is current. A typical value for the aging parameter is 30 days. If a word frequency list is older than the limit specified by the aging parameter, the user's mailbox is marked so that the word frequency list can be regenerated.

A word frequency list is generated on an asynchronous basis because the list generation process is very I/O intensive. If the example top-N assistant module 302 receives a request for a list and the list does not exist, the user's mailbox is marked for list generation but the response to the request is null, indicating that the list does not exist. If a word frequency list does exist but it is not current, being older than the aging parameter allows, the user's mailbox is marked for list generation but the response to the request is return the current list. In addition, a word frequency list may be marked for regeneration on a periodic basis independent of receiving a request for a list. For example, the top-N assistant module 302 may periodically scan all mailboxes and mark mailboxes to regenerate word frequency lists if a timestamp on the word frequency list indicates that the list is more than a predetermined time period, for example more than a month old.

When a user's mailbox is marked for list generation, the server computer determines an appropriate time for an asynchronous process to run and generate the list. The asynchronous process runs when the server computer has the resources available to run the process. This is done to reduce the impact of list generation on mailbox server operation.

The example top-N assistant module 302 generates the word frequency list by parsing a predetermined number of user email messages and determining the number of email messages that contain each unique word. For example, if the word "bicycle" occurs 10 times in one email message, three times in another email message and is not contained in any other email message in the sample, bicycle is assigned a word frequency count of two. It has been estimated that parsing 2000 email messages yields 5,000-10,000 unique words, although this is very subjective and depends on the content of the email messages. It is possible that parsing 2000 email messages may yield 30,000 or more unique words.

In an example embodiment, the top-N assistant module 302 uses the method of distributed random sampling of the server memory to generate the word frequency list. This is a method than has been shown to be more efficient and less I/O intensive for sampling the entire server computer memory than other sampling methods such as non-distributed random sampling (i.e. selecting email messages at random from any part of the server computer memory) and sequential sampling of email messages (where a plurality of email messages are sampled from consecutive logical locations in memory).

Server computer memory is organized in contiguous areas of the server disk known as blocks. Typically, a block is an area of disk, for example 32 MB, which can be read into buffer memory in one I/O operation. The server computer memory contains many databases and each database contains many mailboxes. When a block of server computer memory is obtained, it may contain email messages from more that one database and from more than one mailbox. The method of distributed random sampling samples a fixed number of email messages (for example 10 email messages) from one randomly obtained block before another server memory block is randomly obtained and the same fixed number of email messages is sampled.

In distributed random sampling, a block of server computer memory is randomly selected and read into a buffer. A fixed number of user email messages (for example 10 email messages) are parsed in each email message, breaking up the email message into unique words using standard word-breaking software. For the first user email message parsed the block, each unique word is given a count of one, because it occurs in at least one email message. For the next user email message in the block, each unique word is determined and the list of email messages is updated. For any unique word in the email message already on the list, the count is updated, indicating that the email message appears in at least two email messages. If the unique word isn't on the list, the unique word is added to the list and given a count of one. This process continues for each user email message in the block until either the fixed limit of email messages in the block is reached (for example 10) or until the total number of email messages that needs to be sampled (for example 2000) is reached.

If the fixed limit of user email messages in a block is reached and if the total of email messages parsed is less than the sample size, then another server memory block is randomly selected and read into the buffer. The same fixed number of email messages is then parsed, the unique words in each parsed email message are identified and the word frequency list is updated. The distributed random sampling process continues in a similar manner with additional server memory blocks being randomly sampled, read into buffer memory and parsed until the sample size of user email messages is reached.

In example embodiments, other sampling methods may be used. For example, in non-distributed random sampling, the entire server computer memory may be randomly sampled. This sampling method is more I/O intensive than distributed random sampling, but it typically provides the best results for an entire mailbox. In another embodiment, email messages may be sampled from a contiguous area of memory. For example, the latest N email messages may be sampled from the latest M blocks written on the server computer disk. This method is best for I/O optimization and reflects to a high degree, the word frequency count of the latest N email messages.

The word frequency list for each mailbox is stored in a folder in the user's mailbox and is accessible when a request for the list is made. The word frequency list is added to the mailbox server index so that the list can be easily located and returned. For example, in Microsoft Exchange 2007, the word frequency list is stored as a folder associated item (FAI item). The content index of the mailbox server is updated with each FAI item so that the FAI item can be readily located and obtained. The FAI item also includes a timestamp indicating the age of the word frequency list.

The aging limit for regeneration of a word frequency list and the number of emails sampled to produce the word frequency list are configurable by a system administrator. Typically, the aging limit is 30 days, but there may be applications for which this aging limit may be increased or decreased. Similarly, a typical sample size of 2000 email messages may be modified for a specific application or if it is determined that a different level of granularity is needed. A common initial value for a sampling size is a value equal to 20% of the email messages in a user's mailbox.

When compiling the word frequency list, it is important to filter out words that may be irrelevant or not important. A system of heuristics is provided that results in certain types of words being excluded from the word frequency list. For example, words containing one or more numbers are not included in the list. Words containing non-language characters (for example jdoe@microsoft.com) are not included in the list. In addition, words that do not contain a vowel are not included in the list.

Figure 4:
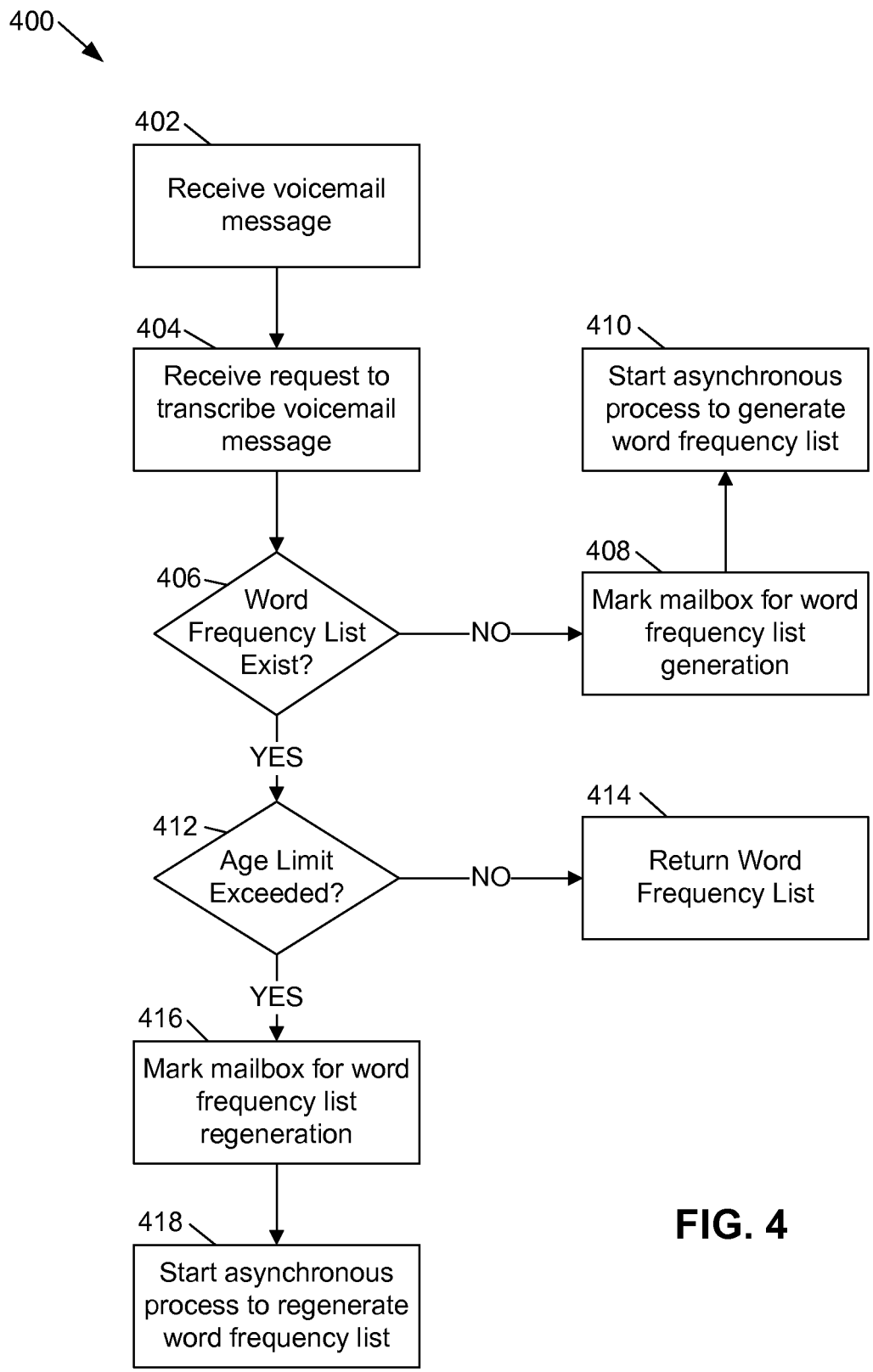
FIG. 4 shows a flowchart for an example method for determining the most frequently used words in a user's mailbox.

FIG. 4 is a flowchart showing a method for generating a list of frequently used words for a mailbox application on a server computer based on a transcription request from a voicemail application. At operation 402, a voicemail message for a user is received on a unified messaging server. At operation 404, the server computer, typically a mailbox server, receives a request to transcribe the voicemail message into text. At operation 406 a determination is made as to whether a word frequency list exists in the user's mailbox. In some embodiments, for example on Microsoft Exchange Server 2007, this is done by checking the FAI item in the mailbox corresponding to the word frequency list. If the word frequency list does not exist on the user's mailbox, at operation 408, the user's mailbox is marked for word frequency list generation. At operation 410, an asynchronous process is started to generate the word frequency list. In addition, a response is returned to the calling voicemail application indicating that the list doesn't exist.

If the word frequency list does exist, the timestamp of the word frequency list is checked at operation 412 to determine if the list is stale. If the age limit has not been exceeded, indicating that the list is still fresh, the word frequency list is returned at operation 414. If the age limit is exceeded, the user's mailbox is marked for word frequency list generation at operation 416 so that the list can be refreshed at operation 418 when the asynchronous process that generates the word frequency list runs.

Figure 5:
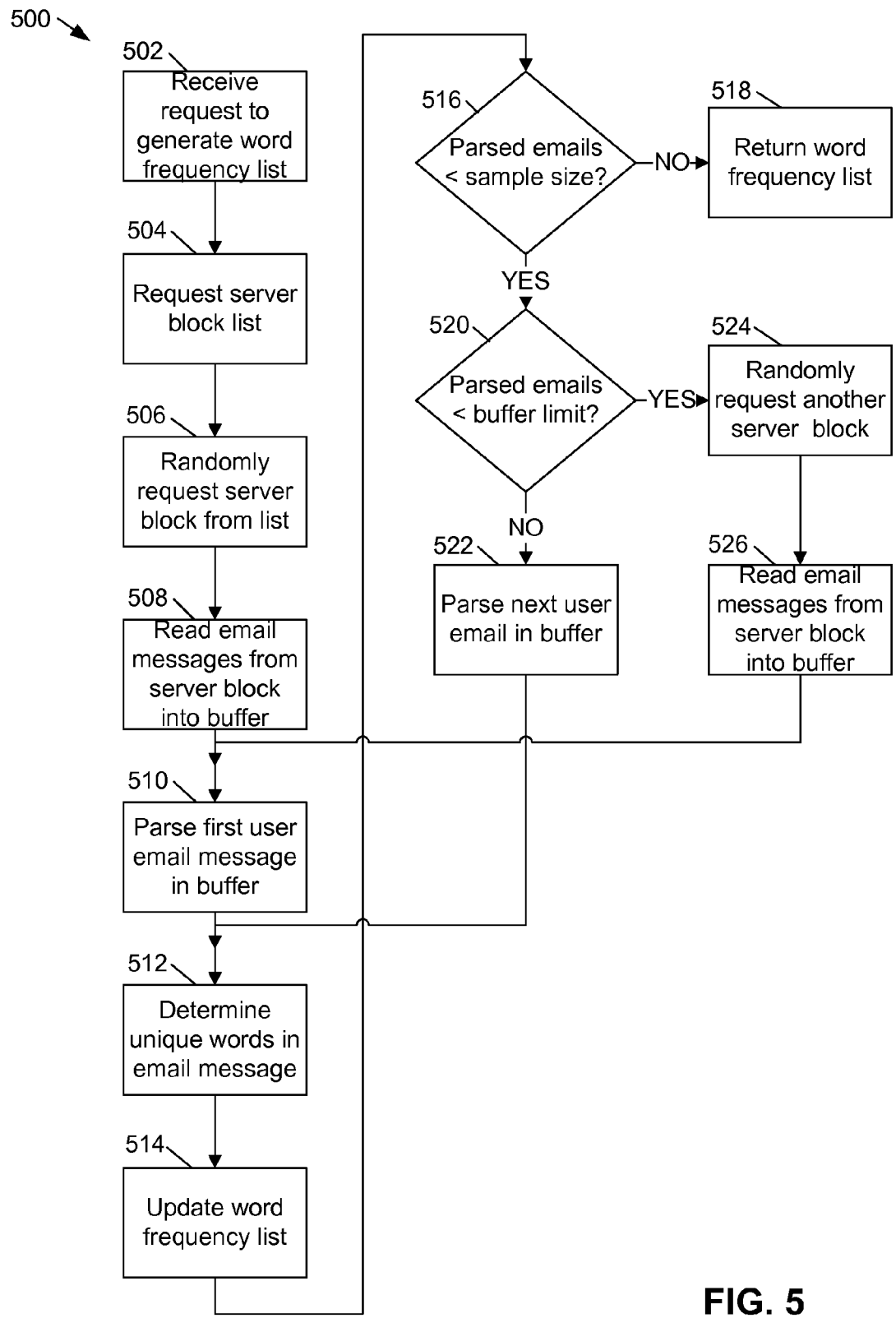
FIG. 5 shows a flowchart for an example method for sampling server memory by distributed random sampling to determine the most frequently used words in a user's mailbox.

FIG. 5 shows a flowchart for sampling memory on a server computer to generate a word frequency list for an email application. At operation 502, a request is received to generate a word frequency list for a user's mailbox on a server computer. At operation 504, a server block list is generated for the server computer. The server block list provides a list of server memory blocks, each block containing at least one email from the user's mailbox. At operation 506, a server memory block is randomly selected from the list. At operation 508, the contents of the server memory block is read into a buffer. At operation 510, the first email message from the user's mailbox in the buffer is parsed. At operation 512, the unique words in the email message are determined As discussed earlier, heuristics are used to exclude words containing numbers, non-language characters and words not containing a vowel. At operation 514, the word frequency list is updated and stored in the user's mailbox, typically as an FAI item. If a new word is added to the word frequency list, that word is given a count of one, indicating that the word is associated with one email message. The counts for unique words in the email message already included in the word frequency list are incremented by one.

At operation 516, it is determined whether the count of email messages parsed is less than a predetermined sampling size, typically 2000 emails. If the sampling size limit has been reached, at operation 518, the word frequency list is returned to the calling application. If the sampling size limit has not been reached, at operation 520 it is determined whether the limit for emails parsed in one block has been reached. As part of distributed random sampling, only a maximum of a predetermined number of email messages is parsed in each block, typically 10 email messages per block. If the limit has not been reached, for example only one message in the block has been parsed, at operation 522 the next email message in the buffer is parsed. The unique words in the email message are determined at operation 512 and word frequency list is updated at operation 514. Then, at operation 516, another check is made to determine whether the sample size has been reached.

If operation 520 determines that the number of email messages in the block is equal to the limit of email messages to be parsed for the block, for example 10 email messages, another server memory block is randomly requested at operation 524. The contents of the server memory block are read into a buffer at operation 526 and the contents of the first email message in the buffer are parsed at operation 510. The number of unique words in the email message is determined at operation 512 and the word frequency list is updated at operation 514. Then, at operation 516, another check is made to determine whether the sample size has been reached.

Figure 6:
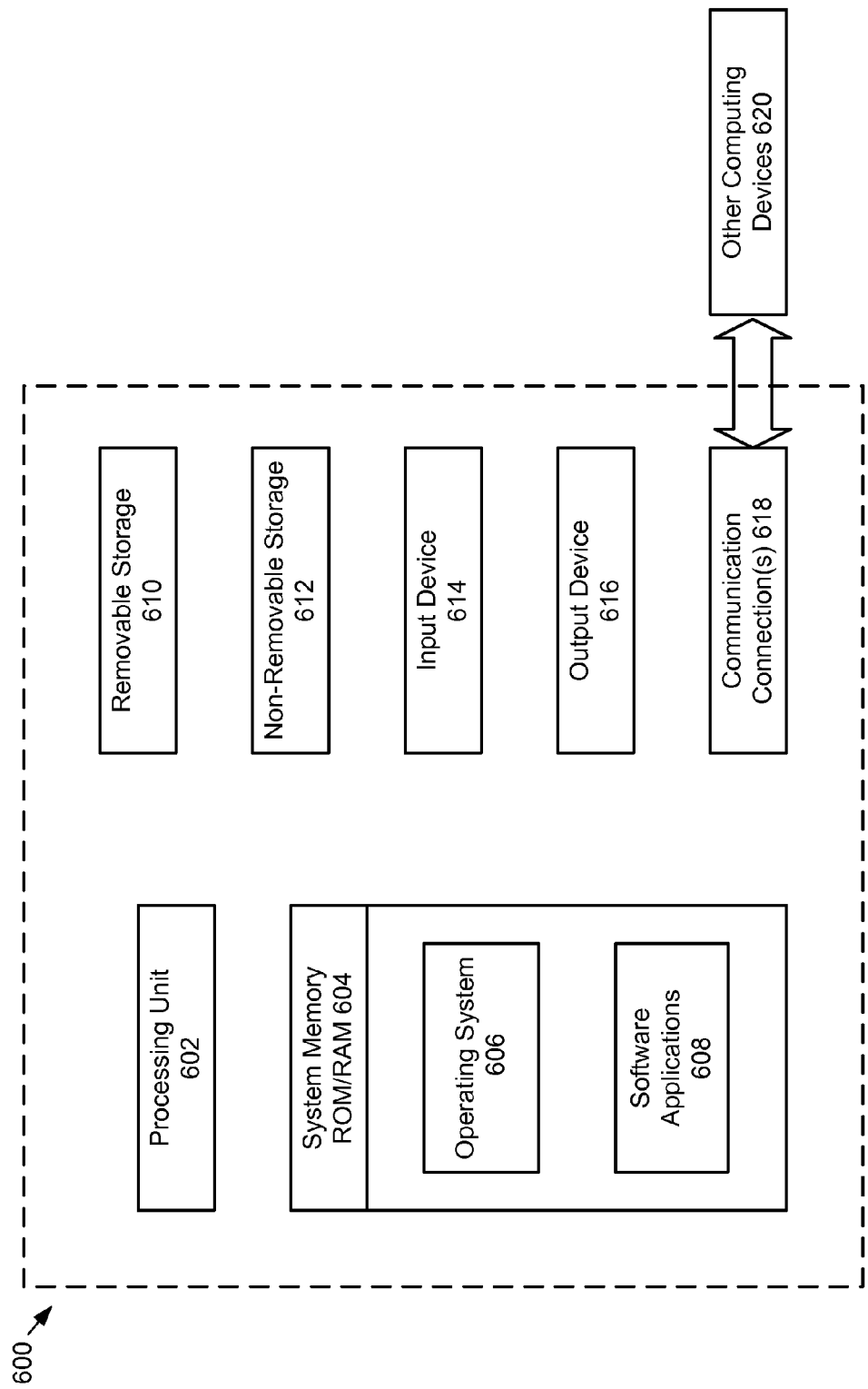
FIG. 6 shows an operating environment for a system in which the most frequently used words in a user's mailbox can be determined

With reference to FIG. 6, one exemplary system for implementing the invention includes a computing device, such as computing device 600. In a basic configuration, the computing device 600 typically includes at least one processing unit 602 and system memory 604. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of a networked personal computer, such as the WINDOWS® operating systems from MICROSOFT CORPORATION of Redmond, Wash. or a server, such as Windows Sharepoint Server 2007, also from MICROSOFT CORPORATION of Redmond, Wash. The system memory 604 may also include one or more software applications 608 and may include program data.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 610 and non-removable storage 612. Computer storage media may include volatile and non-volatile, removable and non-removable media implemented in any method or technology for storage of information, such as computer readable instructions, data structures, program modules, or other data. System memory 604, removable storage 610 and non-removable storage 612 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 614 such as keyboard, mouse, pen, voice input device, touch input device, etc. Output device(s) 616 such as a display, speakers, printer, etc. may also be included. These devices are well known in the art and need not be discussed at length here.

The computing device 600 may also contain communication connections 618 that allow the device to communicate with other computing devices 620, such as over a network in a distributed computing environment, for example, an intranet or the Internet. Communication connection 618 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The various embodiments described above are provided by way of illustration only and should not be construed to limiting. Various modifications and changes that may be made to the embodiments described above without departing from the true spirit and scope of the disclosure.

What is claimed is:

1. A server computer comprising processing and communication resources and configured to:
   receive a request to provide a list of frequently used words in email messages stored in a user mailbox;
   if a word frequency list does not exist, start an asynchronous process in part to provide the word frequency list, the asynchronous process operates to:
      randomly sample server memory blocks that include email messages and parse a predetermined number of the email messages and generate one or more unique words for each of the predetermined number of email messages; and
      generate a word frequency list for the one or more unique words, the word frequency list providing a count associated with the predetermined number of email messages in which each unique word is found;
   use the asynchronous process to regenerate the word frequency list if existing and when an age of the word frequency list is greater than an aging limit; and
   store the word frequency list as part of a user mailbox including a timestamp to indicate a date and time when the word frequency list was created or updated for the user mailbox.

2. The server of claim 1, further configured to use a distributed random sampling method.

3. The server of claim 1, further configured to obtain a subset of the predetermined email messages from a first random memory block before selecting a second random memory block.

4. The server of claim 1, further configured to parse a maximum number of email messages obtained from each random memory block.

5. The server of claim 1, further configured to receive the request using a voice mail transcription application.

6. The server of claim 5, the voice mail transcription application further configured to use the word frequency list to transcribe a voice mail message into text, the word frequency list used to help distinguish between similarly sounding words in the voice mail message.

7. The server of claim 1, wherein the request is received from a voice mail transcription application running on another server computer.

8. The server of claim 1, wherein the request is from an advertising application.

9. The server of claim 1, wherein the predetermined number of email messages to parse is configurable.

10. The server of claim 1, further configured to not include one or more words containing one or more numbers, one or more non-language characters, or words not containing a vowel in the word frequency list.

11. A method comprising:
    requesting a list of frequently used words in email messages stored in a user mailbox;
    using an asynchronous process as part of randomly selecting a first server memory block to identify one or more unique words associated with a number of parsed email messages of the first server memory block to generate a word frequency list to include the one or more unique words associated with the number of parsed email messages of the first server memory block;
    randomly selecting a second server memory block to identify one or more unique words associated with a number of parsed email messages of the second server memory block and include the one or more unique words associated with the number of parsed email messages of the second server memory block in the word frequency list;
    updating a count in the word frequency list for each unique word identified in the number of parsed email messages of the second server memory block already included in the word frequency list;
    using the count to identify a number of email messages that includes each unique word of the word frequency list and
    using the asynchronous process to regenerate the word frequency list if an age of the word frequency list is greater than an aging limit.

12. The method of claim 11, further including:
    randomly selecting server memory blocks from a list of server memory blocks;
    parsing email messages from the server memory blocks until a predetermined limit is reached; and
    updating the count of unique words included in the word frequency list for each email message in which the unique word is contained and adding each unique word to the word frequency list that is not already included in the word frequency list.

13. The method of claim 12, wherein the predetermined limit is configurable.

14. The method of claim 11, further comprising regenerating the word frequency list by starting the asynchronous process based in part on the age of the word frequency list.

15. The method of claim 11, wherein a predetermined criteria for unique words excludes words containing one or more numbers, containing non-language characters and not containing at least one vowel.

16. A system including server computer memory, the system configured to:
    use a list of frequently used words in stored email messages that includes the use of an asynchronous process to generate a word frequency list and regenerate an existing word frequency list based in part on an aging limit, wherein the system uses the asynchronous process to regenerate the existing word frequency list when an age of the existing word frequency list is greater than an aging limit;
    use a list of one or more server memory blocks that contain email messages for a user mailbox, each of the one or more server memory blocks to store user email messages;
    randomly use server memory blocks from the list of one or more server memory blocks;
    parse one or more of the email messages of randomly used server memory blocks to identify unique words of the one or more email messages;

create the word frequency list for parsed email messages to include each unique word that is assigned a count in the word frequency list, wherein the count is updated for each parsed email in which each unique word is found; and store a frequency count of each unique word for the user mailbox.

17. The system of claim 16, further configured to randomly select a different server memory block from the list of one or more server memory blocks, parse each email message of the different server memory block to identify unique words, update the count in the word frequency list for each unique word already included in the word frequency list, and add each unique word to the word frequency list that is not included in the word frequency list.

18. The system of claim 16, further configured to start the asynchronous process to regenerate the word frequency list based in part on the age of the word frequency list.

19. The system of claim 16, further comprising a messaging server.

* * * * *